United States Patent
Kondoh

[11] 4,051,537
[45] Sept. 27, 1977

[54] FACSIMILE RECEIVING APPARATUS
[75] Inventor: Mitsuru Kondoh, Tokyo, Japan
[73] Assignee: Ricoh Co., Ltd., Tokyo, Japan
[21] Appl. No.: 709,019
[22] Filed: July 27, 1976
[30] Foreign Application Priority Data
July 31, 1975 Japan .................................. 50-93815
[51] Int. Cl.$^2$ ............................................. H04N 1/36
[52] U.S. Cl. ................................................... 358/264
[58] Field of Search .......................... 358/264, 268, 265
[56] References Cited
U.S. PATENT DOCUMENTS

| | | | |
|---|---|---|---|
| 3,665,099 | 5/1972 | Emmons | 358/264 |
| 3,894,185 | 7/1975 | Vigri | 358/264 X |
| 3,950,615 | 4/1976 | Murase | 358/265 X |

Primary Examiner—Benedict V. Safourek
Assistant Examiner—Mitchell Saffian
Attorney, Agent, or Firm—Frank J. Jordan

[57] ABSTRACT

A drum speed synchronization signal is transmitted for a predetermined length of time followed by a picture signal. Timing means are arranged to be triggered upon initiation of the synchronization signal to enable a drum speed synchronizer to receive the synchronization signal for a period of time which ends shortly before termination of the synchronization signal to positively prevent the picture signal from being erroneously received by the synchronizer. The timing means enables a printing element to receive the picture signals shortly after termination of the synchronization signal to positively prevent the synchronization signal from being erroneously reproduced.

6 Claims, 17 Drawing Figures $t_0$ $t_5$ $t_4$ $t_1$ $t_2$

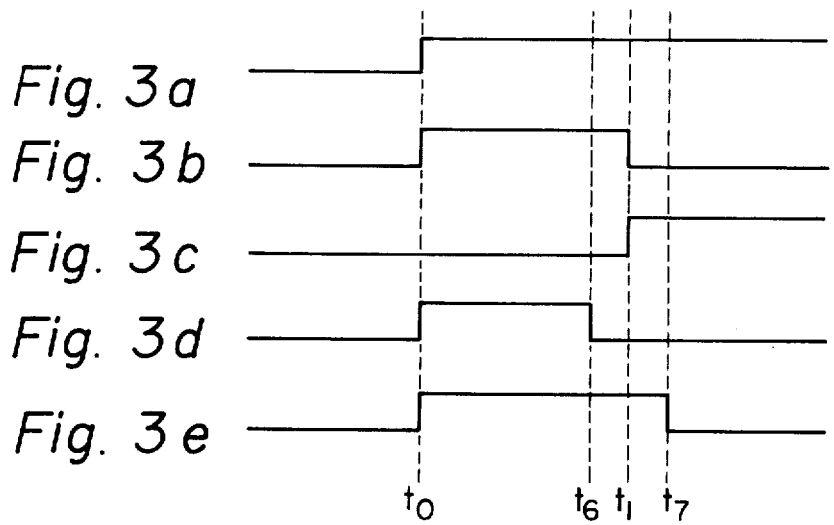
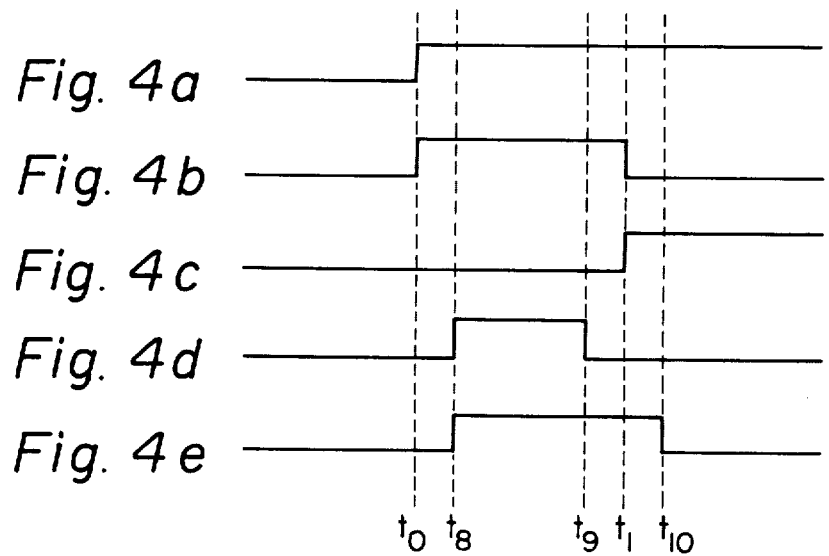

4,051,537

FACSIMILE RECEIVING APPARATUS

BACKGROUND OF THE INVENTION

The present invention relates to an improved facsimile receiving apparatus.

It is known in the art to transmit a synchronization signal for a predetermined length of time prior to transmitting picture signals to a facsimile receiver. The purpose of the synchronization signal is to synchronize the scanning system of the receiver, which typically comprises a rotary drum to which a copy sheet is attached adjacent to which a printing element such as a stylus is provided and means for moving the sytlus longitudinally relative to the axis of the drum, with the scanning speed of the transmitter. Specifically, the synchronization signal may be designed to set the frequency and phase of a pulse generator which produces drum drive pulses. The synchronization circuit may comprise a phase lock loop or similar electronic circuitry designed to lock onto the synchronization signal.

The facsimile receiver comprises the printing element which is responsive to the picture signal and the synchronization circuit which is responsive to the synchronization signal, and also a timing circuit which enables the synchronization circuit to receive the synchronization signal during the time of transmission thereof and subsequently enable the printing element to receive the picture signal. The timing circuit is triggered by the initiation of the synchronization signal and comprises a timer set for a time period equal to that of the synchronization signal.

However, it is difficult in practice to adjust the timers of the transmitter and receiver to precisely the same time period. If the timer of the receiver is set for a period shorter than that of the transmitter, the last part of the synchronization signal will be reproduced by the printing element. If the timer of the receiver is set for a period longer than that of the transmitter, the first part of the picture signal will be received by the synchronization circuit and upset the synchronization.

SUMMARY OF THE INVENTION

It is an object of the present invention to provide an improved facsimile receiving apparatus which positively prevents a synchronization signal from being reproduced and a picture signal from upsetting synchronization.

It is another object of the present invention to provide an improved facsimile apparatus comprising timing means to terminate a synchronization operation prior to reception of a picture signal and to initiate a printing operation slightly after initiation of the picture signal.

It is another object of the present invention to provide a generally improved facsimile receiving apparatus.

Other objects, together with the foregoing, are attained in the embodiment of the present invention described in the following description and shown in the accompanying drawings.

BRIEF DESCRIPTION OF THE DRAWING

FIGS. 3a to 3e in combination constitute a timing diagram illustrating the operation of the facsimile receiving apparatus shown in FIG. 1; and FIGS. 4a to 4e in combination constitute a timing diagram illustrating a modified operation of the facsimile receiving apparatus shown in FIG. 1.

DESCRIPTION OF THE PREFERRED EMBODIMENT

While the facsimile receiving apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
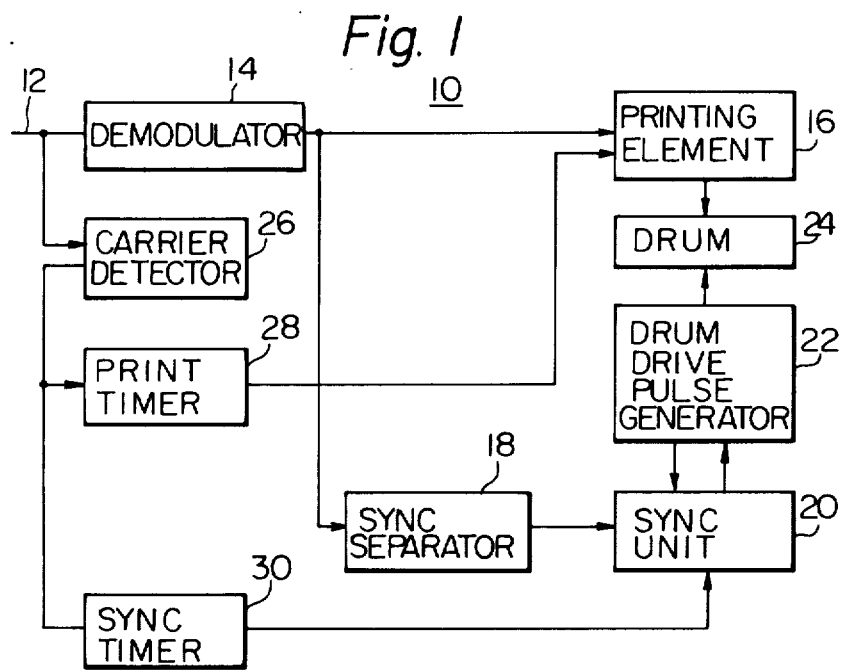
FIG. 1 is a schematic block diagram of a facsimile receiving apparatus embodying the present invention.

Referring now to FIG. 1 of the drawing, a facsimile receiving apparatus 10 embodying the present invention is designed to reproduce a picture corresponding to a picture signal fed thereto from a data link 12 which may be a telephone line, wireless station or the like. The apparatus 10 comprises a demodulator 14 having an input connected to the data link 12 and an output connected to a printing element 16 and a synchronization (sync) separator 18. The output of the sync separator 18 is connected to an input of a synchronization (sync) unit 20 which is operatively connected to a drum drive pulse generator 22 in such a manner as to control the generator 22 and also receive pulse signals therefrom for feedback purposes as will be described in detail below. The printing element 16 and drum pulse generator 22 are connected to a rotary drum 24 to which is fixed a sheet of copy paper (not shown). The apparatus 10 further comprises a carrier signal detector 26 having an input connected to the data link 12 and an output connected to inputs of a print timer 28 and a synchronization (sync) timer 30. The outputs of the timers 28 and 30 are connected to control inputs of the printing element 16 and sync unit 20 respectively.

The drum pulse generator 22 is arranged to produce drum drive pulses which produce rotation of the drum 24 at a speed corresponding to the frequency of the drum drive pulses. The printing element 24 is typically a stylus arranged adjacent to the drum 24 and which is moved longitudinally relative thereto in response to the drum drive pulses in a synchronized manner. The picture signal which is applied to the printing element 16 consists of pulses corresponding to dark portions of the picture for reproduction. In response to a picture signal pulse, the printing element 16 makes a dark mark on the copy sheet. Such a drum and printing element combination is well known in the art and is not shown in detail.

Figure 2A:
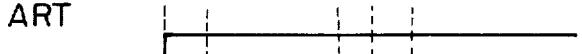
FIGS. 2a to 2f in combination constitute a timing diagram illustrating various problems of the prior art which the present invention overcomes.
Figure 2B:

The picture signal is a modulation component of a carrier signal, as is the synchronization signal. FIG. 2a illustrates the carrier signal as being initiated at a time $t_0$. FIG. 2b shows the synchronization signal component of the modulated carrier signal which is initiated at the time $t_0$ and terminated at a time $t_0$. The picture signal component is initiated at the time $t_1$ and continues until the entire picture is reproduced. The synchronization signal is applied to the sync unit 20 adjusts the frequency and phase of the drum pulses produced by the drum pulse generator 22 to those of the synchronization signal. In this manner, the facsimile receiving apparatus 10 is synchronized to the transmitter (not shown).

In a prior art facsimile receiving apparatus (not shown) having a construction similar to that of the apparatus 10, a single timer produces a pulse signal for the duration of the synchronization signal in response to initiation thereof. The synchronization unit is enabled for the duration of the pulse signal and the printing element is enabled or turned on by the trailing edge of the pulse signal. However, it is impossible in practical application to adjust the timer of the receiver to produce a pulse signal with a period identical to the duration of the synchronization signal. FIG. 2d illustrates what happens if the pulse signal is too long, specifically terminating at a time $t_2$. The printing element is turned on too late, so several lines of the picture are lost. However, this is not an especially serious effect. In addition to this picture loss, the synchronization unit is enabled too long so that the first part of the picture signal is applied thereto. since the picture signal pulses are random compared to the frequency of the synchronization signal, these picture signal pulses may, and often do, upset the synchronization of the synchronization unit.

Figure 2C:
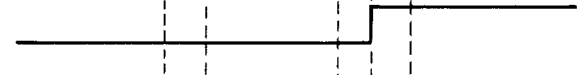
Figure 2D:
Figure 2E:

FIG. 2e illustrates what happens if the pulse signal is too short, specifically terminating at a time $t_4$. The synchronization unit is not enabled for the entire duration of the synchronization signal. However, this effect is not especially serious. In addition to this synchronization time loss, the printing element is turned on too soon so that the last part of the synchronization signal is reproduced on the copy sheet. This renders the reproduced pictures, in many instances, unacceptable for commercial use.

Figure 2F:

FIG. 2f shows a prior art expedient for preventing the last part of the synchronization signal from being reproduced. The timing pulse is designed to have a period equal to the duration of the synchronization signal, but generation of the timing pulse is delayed until a time $t_5$ after initiation of the synchronization signal. As in the case of FIG. 2d, whereas the synchronization signal is positively prevented from being reproduced, the first part of the picture signal is applied to the synchronization unit to upset the synchronization.

The print timer 28 and sync timer 30 of the present apparatus 10 are designed to overcome these disadvantages of the prior art. The carrier detector 26 is adapted to trigger the timers 28 and 30 in response to initiation of the carrier signal, which corresponds to initiation of the synchronization signal. The synchronization and picture signals are demodulated by the demodulator 14 and applied to the printing element 16 and sync separator. Although the sync separator 18 is designed to pass only the synchronization signal frequency, the picture signal often has frequency components of the same value as the synchronization signal so that the sync separator 18 is not entirely effective in blocking the picture signal from the sync unit 20.

FIG. 3a to 3c correspond to FIGS. 2a 2c respectively and illustrate the carrier, synchronization and picture signals. FIG. 3d shows a synchronization (sync) enable pulse signal which is produced by the sync timer 30 in response to triggering by the carrier detector 26. The sync enable signal is initiated at the time $t_0$ and has a duration or period which terminates slightly before the time $t_1$, specifically at a time $t_6$. The sync enable signal applied to the sync unit 20 enables the sync unit 20 to receive the synchronization signal from the sync separator 18 during the duration of the sync enable signal. It will be noticed that since the synch signal terminates before initiation of the picture signal, the picture signal is positively prevented from being applied to the sync unit 20 to upset the synchronization of the drum 24.

FIG. 3e shows a print enable pulse signal which is produced by the print timer 28 in response to triggering by the carrier detector 26. The print enable signal has a period of duration terminating at a time $t_7$ which is slightly after the time $t_1$. The printing element 16 is enabled or turned on by the trailing edge of the print enable pulse to receive the picture signal until the end of the printing operation. It will be noticed that since the printing element 16 is enabled after the time $t_1$ which corresponds to termination of the synchronization signal, the synchronization signal is positively prevented from being reproduced on the copy sheet.

A modification of the timing operation shown in FIG. 3a to 3e is illustrated in FIGS. 4a to 4e. FIGS. 4a to 4c correspond to FIGS. 3a to 3c respectively. In this case, the carrier detector 26 is adapted to delay triggering of the timers 28 and 30 until a time $t_8$ which is slightly after the time $t_0$. The sync timer 30 is adapted to produce the sync enable pulse signal with a shorter duration so as to terminate at a time $t_9$ which is before the time $t_1$ as in the above embodiment. The time $t_9$ preferably corresponds to the time $t_6$. In a similar manner, the print timer 28 is adapted to produce the print enable pulse signal for a shorter duration, being initated at the time $t_8$ and terminating at a time $t_{10}$ which is after the time $t_1$ as in the above embodiment. The time $t_{10}$ preferably corresponds to the time $t_7$.

The timing mode of FIGS. 4a to 4e is advantageous in applications in which it is desirable to allow stabilization of the carrier and synchronization signal generators in the transmitter (not shown) after keying for a time period corresponding to $t_8-t_0$.

In summary, it will be seen that the present invention provides an improved facsimile receiving apparatus in which the objects of preventing the picture signal from upsetting synchronization and preventing the synchronization signal from being reproduced are positively accomplished. Many modifications to the preferred embodiment shown and described within the scope of the invention will become possible for those skilled in the art after receiving the teachings of the present disclosure. For example, the timers 28 and 30 may be replaced by a single counter which is driven by clock pulses and provided with decoders to produce outputs at counts corresponding to the times $t_6$ and $t_7$, although not shown.

What is claimed is:

1. A facsimile receiving apparatus responsive to a synchronization signal and a picture signal for reproducing a picture corresponding to the picture signal, the synchronization signal being produced for a first predetermined length of the time followed by the picture signal, the apparatus comprising:

printing means including printing element means responsive to the picture signal and scan drive means;

synchronization means responsive to the synchronization signal for synchronizing the scan drive means in accordance therewith;

synchronization timing means responsive to initiation of the synchronization signal and connected to enable the synchronization means to receive the synchronization signal only for a second predetermined length of time between said initiation of the synchronization signal and termination thereof, the second predetermined length of time being shorter than the first predetermined length of time; and print timing means responsive to said initiation of the synchronization signal and connected to enable the printing element means to receive the picture signal only after a third predetermined length of time after said initiation of the synchronization signal.

2. A facsimile receiving apparatus as in claim 1, in which the synchronization timing means is arranged to produce a synchronization enable pulse signal, the synchronization means being enabled during a duration of the synchronization enable pulse signal, the print timing means being arranged to produce a print enable pulse signal, the printing element means being enabled by a trailing edge of the print enable pulse signal.

3. A facsimile receiving apparatus as in claim 2, in which the duration of the synchronization enable pulse signal is equal to the second predetermined length of time and a pulse duration of the print enable pulse signal is equal to the third predetermined length of time.

4. A facsimile receiving apparatus as in claim 1, in which the synchronization and picture signals are modulation components of a carrier signal, the carrier signal and the synchronization signal being initiated simultaneously, the apparatus further comprising:

a demodulator connected to receive the modulated carrier signal and having an output connected to the printing element means;

a synchronization signal separator connected between the demodulator and the synchronization means for passing only the synchronization signal to the synchronization means; and a carrier detector connected to receive the modulated carrier and arranged to trigger the synchronization timing means and the print timing means in response to said initiation of the carrier signal.

5. A facsimile receiving apparatus as in claim 1, in which the scan drive means comprises a rotary drum and a drum drive pulse generator.

6. A facsimile receiving apparatus as in claim 2, in which the synchronization timing means and the print timing means are arranged to produce the synchronization enable pulse signal and the print enable pulse signal respectively immediately in response to said initiation of the synchronization signal.

* * * * *